Aug. 4, 1936. W. F. CHRISTEN 2,049,489
GREASE RETAINER CUP AND WHEEL PLATE TOOL
Filed Oct. 19, 1934
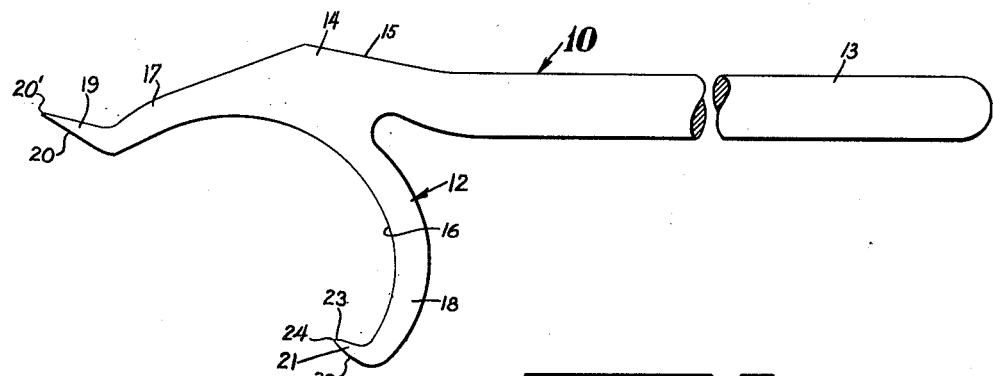
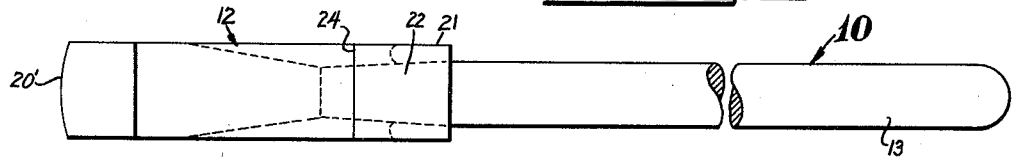
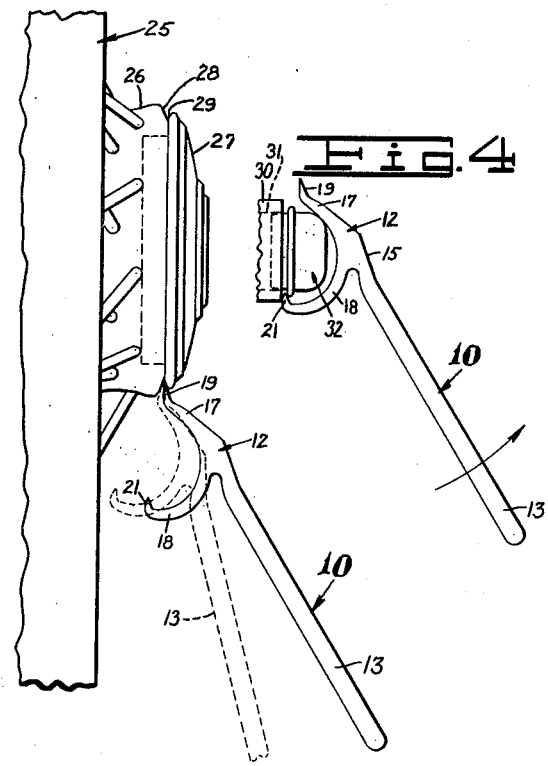
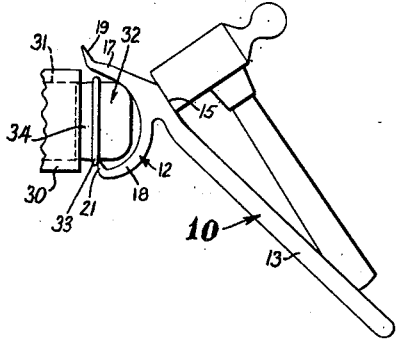
INVENTOR.
W. F. CHRISTEN.
BY
ATTORNEY.

Patented Aug. 4, 1936

2,049,489

UNITED STATES PATENT OFFICE 2,049,489

GREASE RETAINER CUP AND WHEEL PLATE TOOL

William F. Christen, Pasadena, Calif.

Application October 19, 1934, Serial No. 749,036

1 Claim. (Cl. 29—85)

This invention relates to a combined grease retainer cup and wheel plate tool.

The general object of the invention is to provide an improved combination tool for use in connection with either a grease retainer cup or a wheel plate.

A further object of the invention is to provide a novel tool which is particularly adapted for use in removing and inserting a grease retainer cup in automobile wheels.

An additional object of the invention is to provide a novel tool for removing the wheel plate of an automobile wheel.

A further object is to provide a tool for removing a grease retainer cup which includes a scroll portion having a jaw at one end and a fulcrum at the opposite end which is disposed beyond the center of the cap when the gripping jaw is in a service position.

Another object of the invention is to provide a novel grease retainer cup tool which may be used in removing the cup and also in inserting the cup.

Other objects and the advantages of this invention will be apparent from the following description taken in connection with the accompanying drawing, wherein:

Fig. 1 is a side elevation of my improved tool;

Fig. 2 is a bottom plan view of Fig. 1;

Fig. 3 is a fragmentary view of an automobile wheel showing my improved tool being used to remove the wheel plate;

Fig. 4 is a fragmentary view of an axle housing of an automobile showing my improved tool being used to remove the grease retainer cup; and, Fig. 5 is a view similar to Fig. 4 showing my improved tool being used to replace the grease retainer cup.

In certain makes of modern automobiles the wheels are each provided with a grease retainer cup which includes a skirt portion which fits within the hub and which is provided with an outer peripheral flange. It is necessary that these cups be forced tightly into place and it has heretofore been a problem to provide means to facilitate their removal and insertion.

Referring to the drawing by reference characters I have indicated my improved tool generally at 10. As shown the tool 10 comprises a body portion 12 and an integral handle portion 13. The body 12 is substantially semi-cylindrical with the handle 13 extending from the body at an angle to the axis of the body. The opposed sides of the body are parallel as shown. Adjacent the juncture of the body and handle I provide an enlarged portion 14 having a straight forward face portion 15.

The body 12 has a substantially semi-cylindrical recess 16 therein which with the outer contour of the body forms a prong portion 17 which is forward of the juncture of the body and the handle and a prong portion 18 which is rearward of the juncture of the body and handle.

Adjacent the end, the forward prong 17 includes a forwardly extending integral foot portion 19, the upper face and the lower face 20 of which are flat and converge forwardly to form a chisel edge 20'.

Adjacent the end, the rear prong 18 includes a forwardly extending integral foot portion 21, the under surface 22 of which is preferably arcuate. The upper surface of the foot 21 converges forwardly towards the under surface and at the end is abruptly beveled towards the lower surface as at 23 to form a sharp edge 24.

In Fig. 3 I have indicated an automobile wheel generally at 25. The wheel 25 is of the standard wire spoke type having a hollow hub portion 26 which is closed by a wheel plate 27 which includes a reduced flange portion 28 fitting in the hub and frictionally held in engagement therewith.

To remove the wheel plate 27 with my improved tool 10 the edge 20' of the forward foot 19 of the tool is positioned between the beveled face 28 of the hub 26 and the beveled portion 29 of the wheel plate, as clearly shown in Fig. 3. Thereafter by firmly pressing the tool towards the axis of the wheel and swinging the handle of the tool towards the wheel as indicated by the dotted lines in Fig. 3 the face 20 of the foot 19 will engage the face 26 of the hub on which it will fulcrum upon continued movement of the handle towards the wheel and the edge 20' will force the wheel plate away from the hub.

In Fig. 4 I have indicated a portion of a standard type automobile axle housing at 30 which has an axial aperture 31 therein. As is the custom the aperture 31 is closed by a standard type grease retainer cup 32. The cup 32 has a bead 33 therearound intermediate its length. The portion 34 of the cup between the bead 33 and the open end of the cup is tapered. When the cup 32 is positioned on the axle housing 30 the portion 34 of the cup is positioned in the housing aperture 31 and is firmly driven thereinto.

To remove the grease retainer cup 32 with my improved tool 10 the edge 24 of the rear foot 21 is positioned between the face of the axle housing 30 and the bead 33 of the cup and the body 12 of the tool is positioned over the cup with the surface of the tool recess 16 engaging the cup on the opposite side of the axis of the cap from the rear foot 21, as clearly shown in Fig. 4. Thereafter, by swinging the handle of the tool in the direction indicated by the arrow and working around the cup in different positions the tool 10 prys the cup 32 out of engagement with the axle housing 30.

In Fig. 5 I have shown the method of replacing the grease retainer cup with the use of the tool 10. To replace the cup 32 the tool 10 is positioned thereon in substantially the same manner as to remove the cup with the exception that the face 22 of the rear foot 21 engages the outer face of the cup bead 33. After the tool 10 is thus placed on the cup the operator strikes the face portion 15 of the tool a number of blows with a hammer as shown in Fig. 5 to firmly drive the cup portion 34 into the housing aperture 31.

From the foregoing description it will be apparent that I have provided a novel tool which is simple in construction and which is highly efficient in use.

Having thus described my invention, I claim:

In an automobile wheel cap tool, a curved body having a substantially semi-cylindrical inner bearing surface adapted to engage a cap, said semi-cylindrical surface being of a size to straddle a cap, an inwardly projecting pointed radial tooth adjacent to one end of said body and adapted to engage the flange of a cap, an outwardly extending arm on said body intermediate the ends thereof, and a striking surface adjacent the juncture of said body and said arm.

WILLIAM F. CHRISTEN.